May 16, 1950     M. BRANDON ET AL     2,507,588
LOAD SUPPORTING PALLET

Filed Jan. 29, 1947     2 Sheets-Sheet 1

Inventors
Martin Brandon
Franklin P. Robinson
Larry J. Budd
by Arthur M. Nelson
Atty.

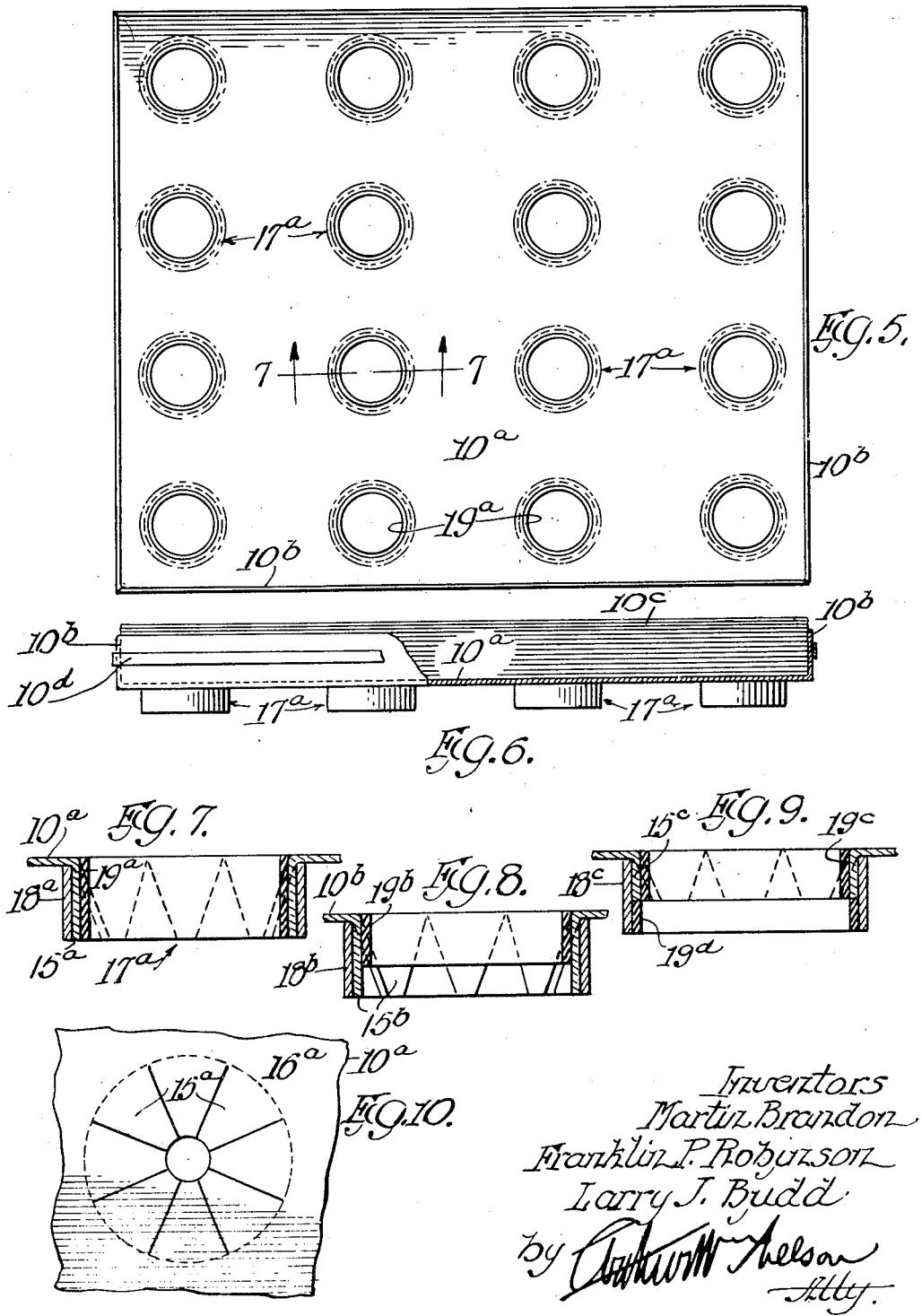

Patented May 16, 1950

2,507,588

UNITED STATES PATENT OFFICE 2,507,588

LOAD SUPPORTING PALLET

Martin Brandon, Villa Park, Franklin P. Robinson, Glenview, and Larry J. Budd, Chicago, Ill., assignors to Pallet Devices, Inc., Chicago, Ill., a corporation of Illinois Application January 29, 1947, Serial No. 725,102

7 Claims. (Cl. 248—120)

1

This invention relates to improvements in load supporting pallets and it consists of the matters hereinafter described and more particularly pointed out in the appended claims. The invention is more particularly concerned with devices in the nature of a load bearing platform for use in connection with a fork lift industrial truck in lifting, moving and stacking and unstacking operations.

One of the objects of the present invention is to provide a pallet of this kind which, though light in weight, is strong and rigid and which is so simple and inexpensive to produce as to be practical to discard after a single use.

Another object of the invention is to provide a pallet of this kind which may be made entirely of paper board, with the parts so arranged as to afford great resistance to crushing under the supported load and to shearing stresses developed when the loaded pallet is slid upon a supporting surface.

A further object of the invention is to provide a pallet of this kind wherein it is possible to band or otherwise tie the supported load thereto and including pillars formed for the passage of the banding or other members used in tying the load thereto.

Also, it is an object of the invention to provide in a pallet of this kind a novel construction of a hollow pillar therefor and which will be more fully described later.

The above mentioned objects of the invention, together with others, as well as the advantages thereof, will more fully appear as the specification proceeds.

In the drawing:

Fig. 1 is a perspective view of a load supporting pallet embodying one form of the invention, with the load borne thereby appearing in dotted lines and which will be more fully mentioned later on.

Figure 1:
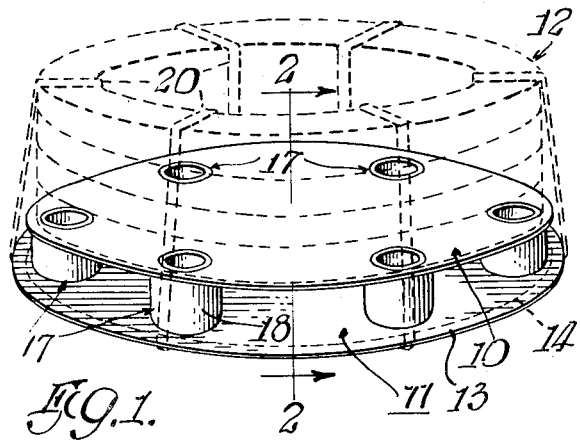
Figure 2:
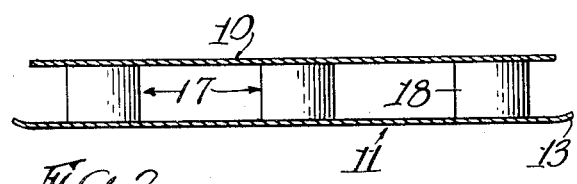
Fig. 2 is a transverse vertical sectional view through the pallet as taken on the line 2—2 of Fig. 1.

2 strapping or banding material are fastened to the pallet.

Fig. 5 is a top plan view of a load supporting pallet embodying a modified form of the invention.

Fig. 6 is a view in side elevation of the pallet appearing in Fig. 5.

Fig. 7 is a detail vertical sectional view, on an enlarged scale, through a part of the pallet of Fig. 5, at one of the pillars thereof, as taken on the line 7—7 of said Fig. 5.

Fig. 8 is a view similar to Fig. 7, showing a modified form of pillar construction.

Fig. 9 is another view similar to Fig. 7, showing a further modified form of pillar construction.

Fig. 10 is a fragmentary view in elevation of a piece of sheet material forming a part of the load supporting member of the modified form of pallet appearing in Figs. 5 and 6 and more particularly shows the manner in which said member is formed to provide an annular set of portions which may be bent into a position perpendicular to the plane of said load supporting member for clamping engagement by coacting parts of a supporting pillar.

In general the improved pallet is preferably made of paperboard and in one embodiment it may include laterally spaced top or load supporting and bottom or base sheets respectively and interposed pillars and in another embodiment it may include only a top or load supporting sheet and depending supporting pillars. In either embodiment, each sheet is provided with annular sets of integral finger-like portions that are bendable into perpendicular positions to be disposed in clamped engagement between the inner and outer members of the pillars which are preferably tubular and provide openings which, in certain instances of use, permit the passage of a banding strap or wire through the pallet for securing the load thereto.

Referring now in detail to that embodiment of the invention illustrated in Figs. 1 to 4 inclusive of the drawings, the improved pallet includes, among the parts thereof, a pair of laterally spaced upper and lower facing sheets or members of sheet material 10 and 11 respectively. Material such as double faced corrugated paper board, or solid craft fibre board (.660) well serves the purpose. The upper member forms the load supporting member of the pallet and the lower member forms the base for the pallet, and these members may be made of that outline shape best adapted for the load to be supported. In the present instance, the pallet is intended to support a stack of spirally wound rolls 12 of steel strapping and as the same are of circular shape, the said sheets 10 and 11 are likewise circular in shape. Preferably the base sheet 11 is of a diameter somewhat greater than that of the load supporting sheet 10 so as to provide a projecting margin 13 joined by a score line 14 (see Figs. 1 and 3) to the body of the sheet 11 and about which said margin may be turned slightly upwardly so that the edge of said margin will not catch upon a supporting surface over which it may be necessary at some time to skid the same.

The sheets 10 and 11 are formed at suitable spaced apart points or intervals with registering annular sets of prongs 15—15 that extend inwardly from a scored circle 16, said prongs having a radial length approximating half the distance between the sheets in the finished pallet when said prongs are turned or folded inwardly from their outer ends as arranged on said circle.

The facing sheets are preferably spaced apart by a number of pillars each indicated as a whole as at 17. Each pillar is preferably made of a tubular paperboard construction and includes an outer one-piece tubular shell 18 and an inner tubular shell composed of two pieces 19—19, each of the same length and which approximates half the length of the shell 18, and of a diameter to fit within the outer shell with some clearance.

In the assembly of the sheets and shells mentioned, the prongs 15—15 of the sheets 10 and 11 are turned inwardly so as to be disposed perpendicular to the plane of the associated sheet. With the sheet 11 arranged on a support with its prongs facing upwardly, an outer shell 18 is disposed so that its bottom end embraces said prongs and thereafter the sheet 10 may be applied so that its sets of prongs are entered into the top ends of the outer shells. At this time, the free end of the prongs of one sheet are disposed in the plane of the like end of the prongs of the other sheet.

Figure 4:
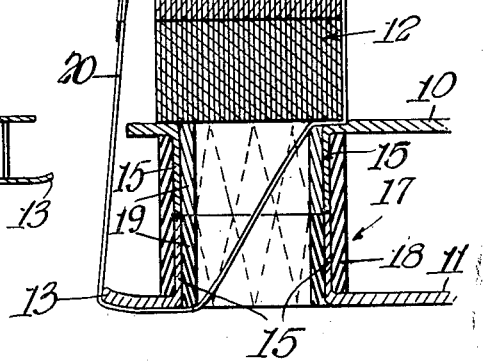
Fig. 4 is a vertical detail sectional view, on an enlarged scale, through one of the pillars and associated part of the pallet and illustrates the manner in which stacked coils of strip steel
Figure 3:
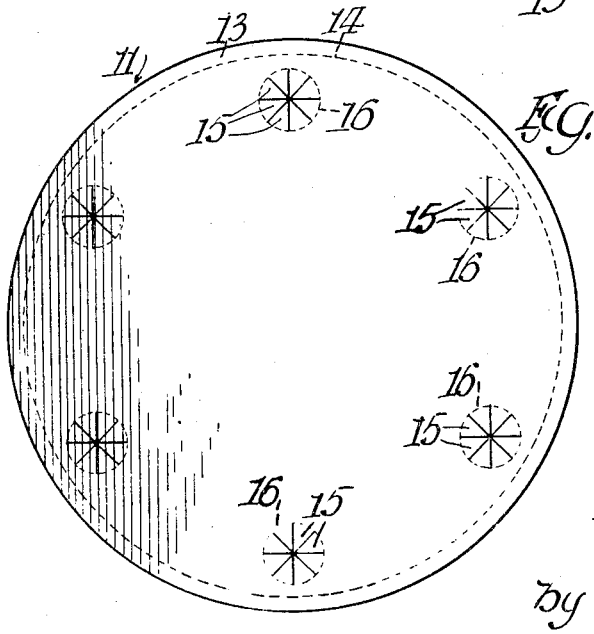
Fig. 3 is a plan view of a blank from which the base sheet of the pallet is made.

Thereafter, an inner tubular shell piece 19 is inserted into each opening left by the inturned prongs 15 of the top sheet and this crushes or somewhat flattens the prongs so that they are securely clamped between said shells, as best appears in Fig. 4. Thereafter the thus far assembled pallet is turned over face-for-face and the second inner tubular shell piece 19 is inserted in each opening left by the inturned prongs of the sheet (now the top sheet, but initially the bottom sheet) and this clamps said prongs in place between the inner and outer shells. When the shell pieces 19—19 are in place, their inner ends engage each other and their outer ends are arranged substantially flush with the sheets 10 and 11. If desired, the engaged surfaces of said prongs and shell members may have glue applied thereto before assembly, so as to be adhesively united together in the completed assembly.

When the parts are assembled, the ends of the outer shell engage at the corners formed by the turning inward of the prongs so that a shoulder engagement is thereby afforded which has a great resistance to shearing strains and therefore the sheets 10 and 11 cannot shift out of position under shearing stresses.

It will be obvious that each pillar 17, being of the tubular structure described, affords a passage therethrough with the ends of each passage opening through both sheets 10 and 11 respectively. The construction described, which though light in weight, affords such a great resistance to compressive forces as to insure against collapse when the loaded pallets are stacked, one upon the other in storage.

As before mentioned, the structure shown is circular in shape and is especially adapted for use in connection with coils of banding material or wire. In the use of the pallet with such coils, which are indicated at 12, a piece of banding material 20 is inserted through the passage afforded by each pillar and then bent down to lie upon the top sheet. Thereafter, the coils of banding material 12, which have a diameter approximating the diameter upon which the centers of the pillars are disposed, are stacked one upon the other and will overlie the pillars. Thereafter the ends of each piece of banding material are brought up around the sides of the stacked coils and are secured together in any suitable manner which will hold the coils in position upon the pallet. In applying these pieces of banding material 20, the margin 13 of the base sheet will be turned upwardly to dispose the edge of said margin above the plane of the surface, upon which the pallet is engaged. Thus the loaded pallet may be skidded on said surface without catching thereon.

The pillars are of such height as to space the facing sheets 10 and 11 the desired distance apart and they are so arranged as to afford space therebetween to permit the ready insertion into said space of the pair of pick up forks (not shown) of an industrial truck for transport and stacking in a place of storage.

In Figs. 5 and 6 is illustrated a modified form of pallet construction wherein the base sheet, before mentioned in connection with Figs. 1 to 4 inclusive, is omitted, and in Figs. 7, 8 and 9 are shown forms of pillar constructions therefor, which are lower in height and of a diameter greater than that of the pillar structure shown in said Figs. 1 to 4 inclusive.

In Fig. 5 the pallet is shown as including only the load supporting member 10a of rectangular shape and a longitudinal and transverse rows of laterally spaced tubular pillars 17a, which are preferably of a diameter greater than the depth or length thereof. As before, the load supporting member 10a is provided with sets of prongs 15a—15a (see Fig. 10) that extend inwardly from a scored circle 16a, and are adapted to be turned or folded into a position perpendicular to the plane of the member 10a along lines arranged on said circle 16a. In instances where the pillars 17a are of a diameter greater than the depth thereof, the fingers are cut away as at their inner ends, as appears in Fig. 6, to leave the fingers of a radial length approximating said depth.

In Fig. 7 is shown a vertical sectional view through one of the pillars of the finished pallet, wherein the fingers 15a are clamped in position between the inner and outer shells 18a and 19a both of the same length. Thus, the bottom edges of both shells, as well as the fingers 15a are disposed in the same plane and the top edge of the inner shell terminates substantially flush with the top surface of the member 10a.

In Fig. 8 is shown a pillar construction wherein the inner shell 19b is only substantially half the length or depth of the outer shell 18b, while the fingers 15b approximate in depth, that of said outer shell. In this instance the bottom edge of the shell 19b is spaced a considerable distance above the bottom edges of the outer shell and said fingers while the top edge of said shell is substantially flush with the top surface of the member 10b.

In Fig. 9 the fingers, which are indicated at 15c are only of about half the depth of the outer shell 18c and approximate the depth of the inner shell, which is indicated at 19c. In a structure of this kind, the bottom portion of the outer shell 18c extends some distance below the bottom edge of the fingers 15c and shell 19c respectively and there is slipped into this portion of said shell 18c an internally bracing ring 19d.

It is apparent that, if desired, a suitable adhesive may be employed in the structures above described to unite the parts thereof together.

When the pallet is intended for supporting a heavy load, such as a stack of metallic sheets, which may have a tendency to shift relatively to the member 10a, said member may be provided with marginal portions that are joined to the body of the member by means of suitable scored lines. These portions may be turned upwardly along said scored lines, as flanges 10b, to form a shoulder effect along all edges of the member against which the associated edges of the lowermost metal sheets 10c on the member may abut. Preferably these flanges are held in this shoulder forming position by passing a member 10d about said flanges, and which member is indicated as a flat band or strap in Fig. 6. Thus the stack of metal sheets is confined against shifting relatively to the member 10a.

The constructions described, though light in weight, are strong and rigid and possess great strength against compressing forces of the supported load and at the same time possess great strength against shear forces tending to tear the pillars from the load supporting member. The pallet described is especially useful for operations wherein there is no necessity of skidding them on a supporting surface and they afford ample room under the member 10a for the insertion of the pick up forks of the truck employed in transporting and stacking the same.

The pallet, though light in weight, and made entirely of paperboard stock, is strong and rigid and may be produced at an exceptionally low cost compared to those of wood, as heretofore used.

Furthermore, the parts may be shipped to the user for assembly at the place of use and this without the aid of any tools or appurtenances other than a glue pot, if it is desired to use the same, as before mentioned. It may be readily produced in that outline shape best adapted for the load to be supported.

While in describing the invention we have referred in detail to the material, form thereof, and arrangement of parts employed, the same is to be considered only in the illustrative sense and therefore we do not wish to be limited thereto except as may be specifically set forth in the appended claims.

We claim as our invention:

1. A load supporting pallet embodying therein a base of sheet material, a load engageable member of sheet material spaced laterally from said base, a plurality of spaced apart pillars between said base and said member respectively, each pillar including an outer tubular member and an inner tubular member, which receive therebetween inturned portions of said base and said load supporting member respectively, said inner tubular members providing passages through the pallet.

2. A load supporting pallet embodying therein a base of paperboard material, a load engageable member of paperboard material spaced laterally from said base, a plurality of spaced apart pillars between said base and said load engageable member respectively, each pillar including an outer tubular element of paperboard material and an inner member of paperboard material, which clampingly engage inturned portions of said base and said member respectively.

3. A load supporting pallet embodying therein a base of paperboard material, a load engageable member of paperboard material spaced laterally from said base, a plurality of spaced apart pillars between said base and said member respectively, each pillar including an outer tubular element of paperboard material and an inner member of paperboard material, which clampingly engage inturned portions of said base and said load supporting member respectively, the inner member being tubular and comprising two portions insertable into position from opposite sides of the pallet as formed by said base and said member respectively.

4. A load supporting pallet embodying therein a load engageable member of sheet material provided on one side with a plurality of annular sets of integral perpendicular portions in certain areas thereof, and a plurality of supporting pillars for said member, one associated with each set of said perpendicular portions, each pillar including a member that is at least tubular in part and which part has a holding engagement with one side of the portions of the associated set.

5. In a load supporting pallet, the combination of a load supporting member of sheet material having in an area thereof a set of integral prongs bent from the plane of said member to extend perpendicularly from the underside thereof and defining an opening in said member, and a supporting pillar for said area, said pillar being tubular at least its upper end, where it corresponds internally with the shape of said openings, said upper end of the pillar surrounding said set of prongs and being attached thereto with its extremity engaging the under side of said member outwardly of said prongs.

6. In a portable material handling pallet adapted for use in lift truck operations and embodying therein a load supporting sheet member and a plurality of supporting tubes elevating said sheet member, means to reinforce the supporting sheet member comprising portions displaced from the plane of said sheet, which portions are disposed within said tubes and are adhesively secured thereto.

7. In a load supporting pallet, the combination of a load supporting member of sheet material having in an area thereof a set of integral prongs bent from the plane of said member to extend perpendicularly from the underside thereof and defining an opening in said member, and a supporting pillar for said area, said pillar at least at its upper end being tubular where it corresponds internally with the shape of said openings, said upper end of the pillar surrounding said set of prongs and being attached thereto with its extremity engaging the under side of said member outwardly of said prongs, and an inner tubular member positioned within at least a part of the tubular upper end of the pillar and coacting therewith in locking said integral prongs in place between its external wall and the internal wall of the pillar whereby said load supporting member and the pillar are firmly united.

MARTIN BRANDON.
FRANKLIN P. ROBINSON.
LARRY J. BUDD.

REFERENCES CITED

The following references are of record in the file of this patent:

UNITED STATES PATENTS

| Number | Name | Date |
|---|---|---|
| 1,025,493 | Vogel | May 7, 1912 |
| 1,101,967 | Smith | June 30, 1914 |
| 1,902,072 | Harrod | Mar. 21, 1933 |
| 2,108,398 | Allen | Feb. 15, 1938 |
| 2,312,893 | Foy | Mar. 2, 1943 |
| 2,347,836 | Moore | May 2, 1944 |
| 2,369,944 | Cahners | Feb. 20, 1945 |
| 2,391,420 | Huber | Dec. 25, 1945 |
| 2,444,184 | Cahners | June 29, 1948 |